No. 649,104. Patented May 8, 1900.
H. W. JOYCE.
DRAW-OFF LOCKING TAP.
(Application filed Mar. 9, 1900.)

(No Model.)

Witnesses.

Inventor:
Horace William Joyce
By Richardson
his Attorneys.

UNITED STATES PATENT OFFICE.

HORACE WILLIAM JOYCE, OF HEREFORD, ENGLAND.

DRAW-OFF LOCKING-TAP.

SPECIFICATION forming part of Letters Patent No. 649,104, dated May 8, 1900.

Application filed March 9, 1900. Serial No. 8,068. (No model.)

*To all whom it may concern:*

Be it known that I, HORACE WILLIAM JOYCE, a subject of the Queen of Great Britain and Ireland, and a resident of Hop Market, Broad street, Hereford, in the county of Hereford, England, have invented a certain new and useful Improvement in Draw-Off Locking-Taps, (for which I have made application in Great Britain, No. 10,503, dated May 18, 1899,) of which the following is a specification.

My invention relates to an improvement in draw-off locking-taps of the kind referred to in prior patents, No. 582,394, dated May 11, 1897, and No. 615,090, dated November 29, 1898; and the object of my present improvement is to simplify and improve the construction and so to reduce the cost of production of such taps. In the construction of taps referred to in the prior patents cited the body of the tap is in some cases (and as now generally used) screwed from the front of the cask into a metallic bush fixed into the cask from the interior thereof, due provision being made for securing an efficient tight joint between the two said parts.

Now according to my present improvement I do not screw the body itself into the bush, but I secure it therein by a screwed ring, and I mount the inner venting-tube upon the removable tap-body.

In order that my improvements may be readily understood, I will describe same in reference to the accompanying drawings, in which—

Figure 1:
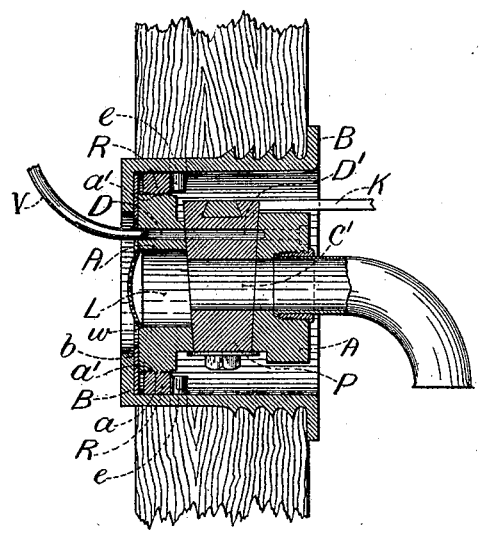
Figure 2:
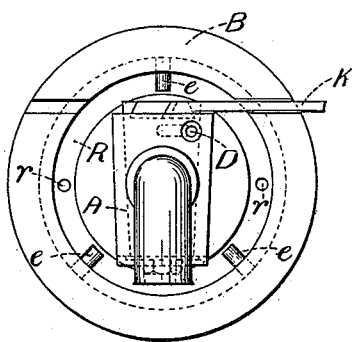

Figure 1 is a vertical section, and Fig. 2 a front elevation, of a draw-off locking-tap embodying my improvement.

In the figures, B is the bush, screwed into or otherwise affixed to the cask from the outside, as shown, although it may be fixed from the interior, if so arranged.

A indicates the loose body part of the tap, with liquid-passage L and air-duct D.

P is the rotary plug, adapted to be operated by locking-key K and having liquid-passage C' and air-duct D', corresponding to those in the body A.

According to my improvement the inner end of the loose body part A is provided with a flat or plain surface $a$, adapted to make a face-joint with or without the aid of a washer $w$, with a plain surface $b$ on the front inner side of the bush B, said joint being secured by means of a ring R, screwing upon a correspondingly-screwed surface $a'$ of the body A and abutting rearward against studs or projections $e$ upon the bush B. The said ring R is first placed in position at the inner end of the bush B and then secured by the studs or projections $e$ afterward attached.

In fixing the body A to the bush B the former is pressed forward against the ring R, while the latter is screwed back against the studs $e$. Thus the body A is forced strongly against the inner surface $b$ of the bush and a tight joint is secured with or without the aid of the washer $w$.

The ring R is operated by a compass-key fitting into holes such as $r\ r$, or otherwise conveniently.

The construction and arrangement of plugs, air-ducts, keyway, &c., may be, as shown, in accordance with my former patents or otherwise; but in the present arrangement the upwardly-projecting venting-tube V is curved, as shown, and attached to the removable body part A, so that it may be removed therewith for cleaning or other purposes. The said venting-tube and air-ducts are, as described in my prior patent, No. 615,090, available for the injection of compressed air when such is employed, as with lager-beer in casks, to force the beer out.

Having now described my invention, what I claim as new, and desire to secure by Letters Patent, is—

1. In a draw-off locking-tap of the kind referred to the combination with a bush having a plain inner surface of a loose body part having a corresponding plain surface and a ring adapted to be screwed upon said body and abutting rearwardly against studs or projections on the bush, substantially as and for the purpose set forth.

2. In a draw-off locking-tap of the kind referred to the combination of a bush B screwed into the cask from the exterior and having a plain inner surface $b$, a removable body part A having plain inner surface $a$ adapted to make a tight joint with the aid of washer $w$ with the surface $b$ in the bush, a ring R screwing upon said body part $a'$ and studs or projections in bush B for preventing backward movement of said ring, all substantially as and for the purpose set forth.

3. In taps of the kind referred to the combination of a bush B having a plain inner surface $b$, a removable body part A having a plain inner surface $a$ adapted to make a tight joint with the plain surface $b$ in the bush, said body part having an air-duct D and a venting-tube V attached to and removable with the body, a ring R screwing upon the body A and abutting rearwardly against projections on the bush B all substantially as and for the purposes set forth.

In witness whereof I have hereunto signed my name in the presence of two subscribing witnesses.

HORACE WILLIAM JOYCE.

Witnesses:
JOSEPH THOMAS,
FREDERICK ERNEST KYNASTON.